United States Patent [19]
Bergland et al.

[11] Patent Number: 5,676,073
[45] Date of Patent: Oct. 14, 1997

[54] CLOSING WHEELS ADJUSTMENT MECHANISM

[75] Inventors: Norman Robert Bergland, Moline; Loyd Thomas Hubbard, Jr., Hampton, both of Ill.

[73] Assignee: Deere & Company, Moline, Ill.

[21] Appl. No.: 636,046

[22] Filed: Apr. 22, 1996

[51] Int. Cl.⁶ .................................................. A01C 5/00
[52] U.S. Cl. ........................... 111/196; 111/194; 172/538
[58] Field of Search ................................. 111/190, 191, 111/194, 195, 196; 172/701, 538; 403/12, 13, 14, 112, 113, 116

[56] References Cited

U.S. PATENT DOCUMENTS

| | | | |
|---|---|---|---|
| 757,999 | 4/1904 | Davis | 172/538 |
| 1,040,049 | 10/1912 | Steele | 111/196 X |
| 1,165,735 | 12/1915 | Wentz | 172/538 |
| 1,901,299 | 3/1933 | Johnson | 111/196 X |
| 3,719,158 | 3/1973 | Roths | 111/196 X |
| 4,009,668 | 3/1977 | Brass et al. | 111/85 |
| 4,404,918 | 9/1983 | Whalen et al. | 111/196 |
| 4,570,554 | 2/1986 | Clark | 111/85 |
| 5,375,542 | 12/1994 | Schaffert | 111/190 X |
| 5,394,946 | 3/1995 | Clifton et al. | 172/538 X |
| 5,542,774 | 8/1996 | Hoy | 403/116 |

OTHER PUBLICATIONS

John Deere Plow & Planter Works Operator's Manual OM–A50312 Issue E6 "7300 Integral MaxEmerge® 2 Planters", Introduction and p. 59, printed in U.S.A.

Primary Examiner—Terry Lee Melius
Assistant Examiner—Victor Batson

[57] ABSTRACT

The present invention is an adjustment mechanism to move the seed firming wheels into its correct side-to-side position. The seed firming wheels are rotatably mounted to a bracket which in turn is mounted to a wheel support member of the planter unit frame. The bracket is provided with two radiused bushings which cooperate with radiused surfaces in the side walls of the wheel support member. The side walls and the wheel support member are provided with fore/aft extending slots through which adjustment bolts pass through the bracket and sidewalls of the wheel support member for clamping the bracket to the wheel support member.

11 Claims, 2 Drawing Sheets

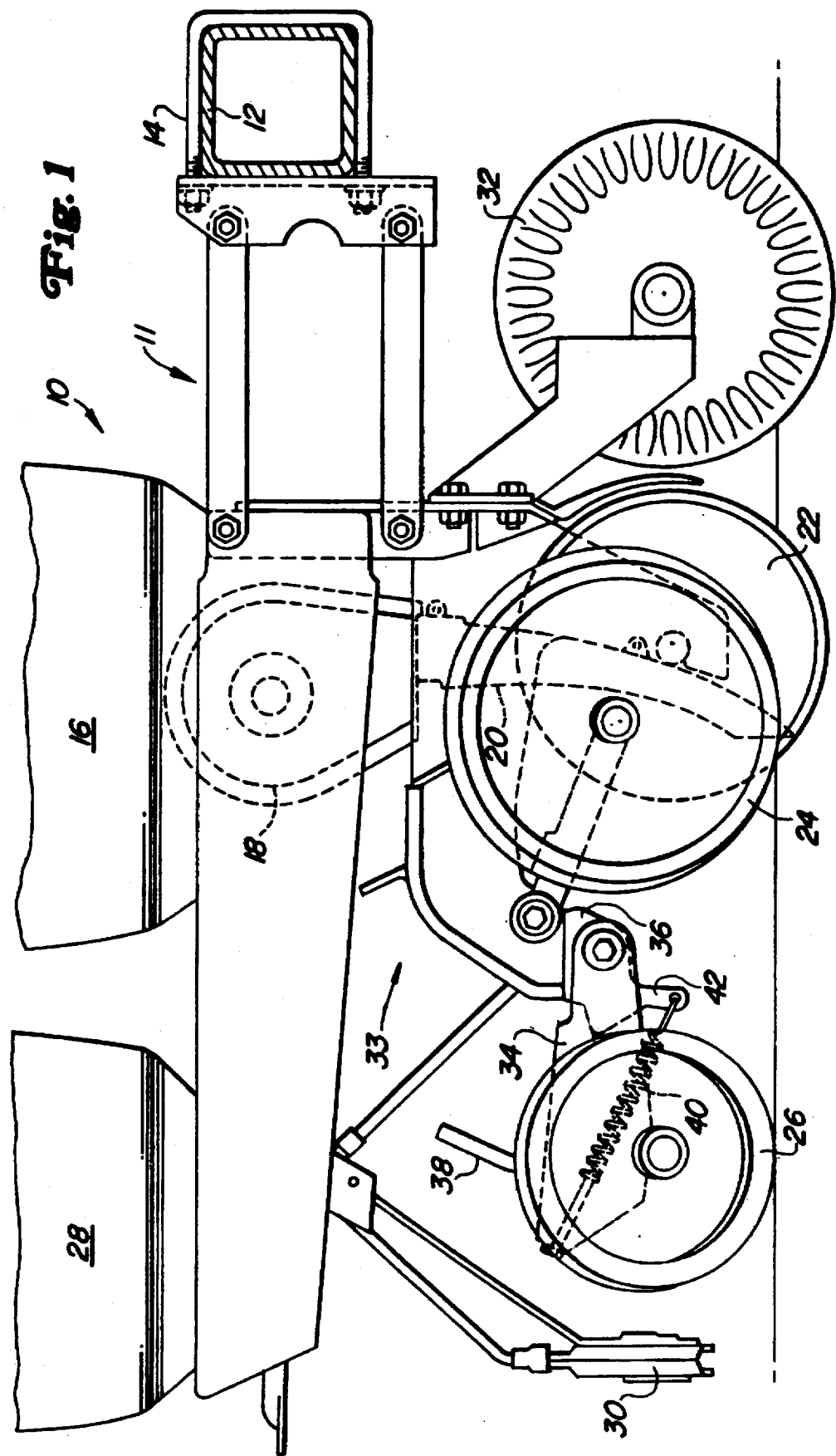

CLOSING WHEELS ADJUSTMENT MECHANISM

BACKGROUND OF THE INVENTION

1. Field of the Invention

The invention is directed to a simple mechanism for adjusting the side-to-side position of the closing wheels relative to the seed planting furrow.

2. Description of the Prior Art

Row crop planters generally comprise a transverse toolbar having a series of rearwardly extending planting units. These units have a frame to which is mounted a furrow opener for forming a seed planting furrow in the seedbed. The furrow opener maybe provided with depth control wheels for controlling the depth of the furrow. A seed hopper maybe mounted to the frame and direct seed to a seed meter. The seed meter meters the seed and directs the seed through a seed tube to the seed planting furrow formed by the furrow opener.

Following the seed tube and the furrow opener are closing wheels. One type of closing wheels are seed firming wheels. Seed firming wheels serve the dual purpose of closing the seed planting furrow and firming the seed bed. To prevent crusting and aid in seed emergence the soil directly over the seed is not packed. To accomplish this the seed firming wheels are angled to the seed planting furrow.

It is important that the seed firming wheels be correctly aligned with the furrow so that the furrow is properly closed and firmed. In one row crop planter currently on the market, the frame of the planting unit is provided with a wheel support member. The seed firming wheels are rotatably mounted to a bracket that is mounted to the wheel support member. The bracket is held in place by caps screws having an adjusting cam. By moving the cam clockwise, after the cap screws having been loosened, the seed firming wheels are moved to the right. If the cam is rotated counterclockwise the seed firming wheels move to the left. The cap screws are retightened to clamp the seed firming wheels in their correct positioned.

SUMMARY

It is an object of the present invention to provide a simple adjustment means for adjusting the side-to-side position of the closing wheels of a planter relative to the seed planting furrow.

The closing wheels are rotatively mounted to a bracket that is pivotally mounted to a planting unit frame. The planting unit frame is provided with a wheel support member having left and right sidewalls. Both sidewalls are radiused. The bracket is provided with left and right radiused bushings. Adjustment bolts pass through the bushings and the sidewalls of the wheel support member to clamp the bracket in place. By rotating the bracket about a vertical axis the side-to-side position of the seed firming wheels is changed. Fore/aft extending slots in the left and right sidewalls of the wheel support member act as a guide for the side-to-side adjustment. The bushings are provided with two semi-circular projections which project into the fore/aft extending slots.

BRIEF DESCRIPTION OF THE DRAWINGS

FIG. 1 is a side view of a row crop planter unit.

DETAILED DESCRIPTION

Figure 3:
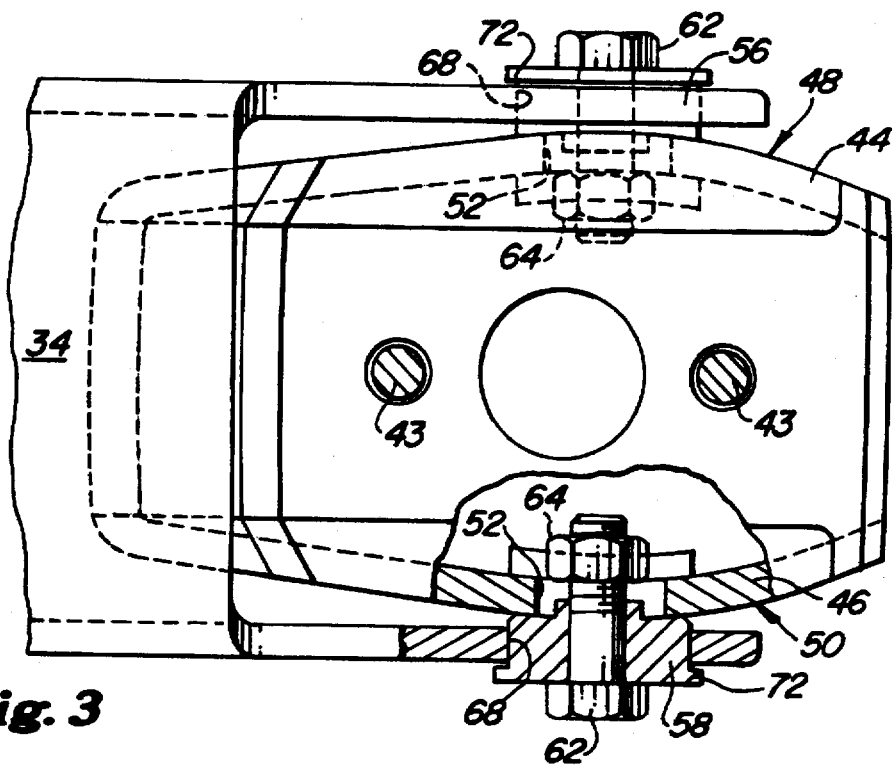
FIG. 3 is a top view of the wheel support member taken along line 3—3.

FIG. 1 discloses an agricultural planting unit 10. The planting unit is provided with a parallel linkage 11 that is mounted to a transverse toolbar 12 by U-bolt 14 in a conventional manner. The planting unit is provided with a seed bin 16 which directs seeds to a seed meter 18. The seed meter 18 directs the measured seeds to a seed tube 20 for placing the seeds in a seed planting furrow. The seed planting furrow is formed by a furrow opener 22. Gauge wheels 24 control the depth of the furrow opener 22. A pair of seed firming wheels 26 close the trench after the seed has been deposited into the trench by the seed tube 20. The illustrated planting unit is also provided with a pesticide bin 28 for directing pesticides to the ground by applicator 30. A suitable pesticide meter (not shown) controls the application of the pesticide. In addition, a bubble coulter 32 is positioned forward of the furrow opener 22 to aid in opening the seed planting furrow. All of these elements are mounted to a planter unit frame 33.

The above disclosed planter is of a relatively conventional configuration. Typically, a plurality of planting units are mounted on toolbar 12 so that a farmer could plant more than one row in a single pass over the field. Although the present invention as illustrated as being mounted to a row crop planting unit 10 it could also be mounted to other seeding equipment like grain drills, and as such, the invention should not be limited to row crop planters.

Figure 2:
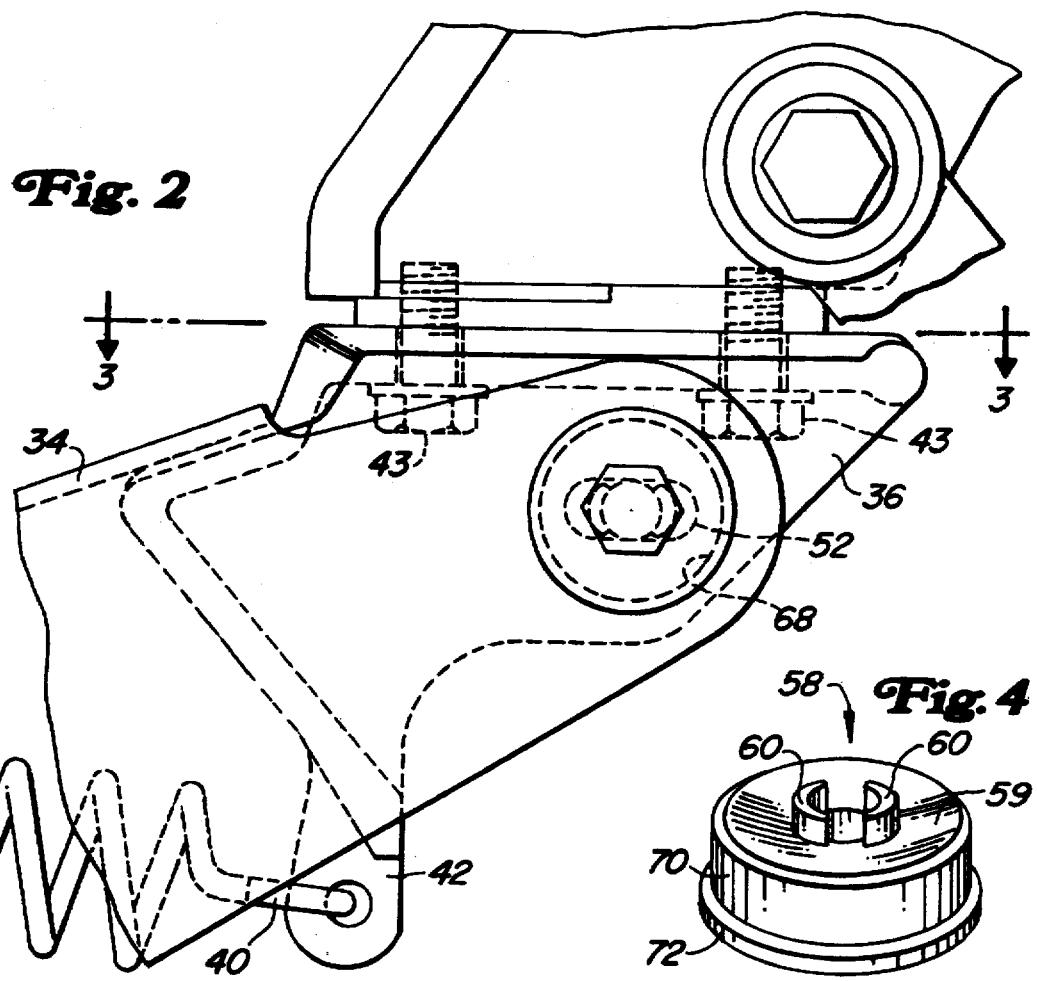
FIG. 2 is a side view of the wheel support member and bracket.
Figure 4:
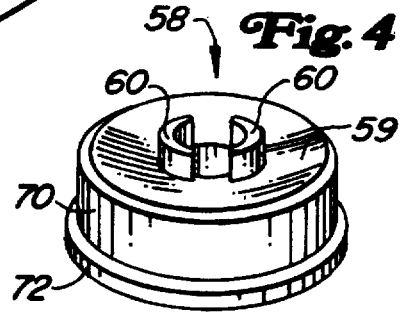
FIG. 4 is a perspective view of one of the bushings.

The seed firming wheels 26 are rotatively mounted to a bracket 34 which in turn is mounted to wheel support member 38. The bracket is provided with a handle 38 which can be moved to control the amount of downpressure transferred from the planting unit to the seed firming wheels 26. The handle is coupled to a spring 40 which is also coupled to a downward depending tang 42 on the wheel support member 36. The details of the wheel support member 36 are best illustrated in FIGS. 2–4. The wheel support member 36 is a casting that is bolted to the planting unit by bolts 43. Member 36 is provided with left and right side walls 44 and 46, respectively, both having left and right radiused surfaces 48 and 50, respectively. In addition, the left and right side walls are provided with fore/aft extending slots 52.

The bracket is provided with a left and right radiused bushings 56 and 58, respectively. The radiused surfaces 59 of the bushings 56 and 58 contact the radiused surfaces 48 and 50 of the wheel support member 36. The bushing is also provided with two semi-circular projections 60 which are received in the fore/aft extending slots. Two adjustment bolts 62 with nuts 64 are used to clamp the bracket to the wheel support member. These adjustment bolts 62 pass through the bushings 56 and 58 and the fore/aft extending slot 52 and are held in place by nuts 64.

The bushings 56 and 58 are located in a large, round apertures 68 in the side walls of the bracket. Each bushing is provided with a cylindrical body 70, with an outwardly extending rim 72. The outwardly extending rim 72 bears against the exterior side walls of the bracket, as illustrated in FIG. 3.

The operator, in adjusting the side to side position of the closing wheels first loosens the adjustment bolts and then pivots the bracket around a vertical axis until the seed firming wheels are correctly positioned in their side-to-side position. The adjustment bolts are then retightened, clamping the bracket in place. This provides a simple assembly for changing the side to side position of the seed firming wheels.

The invention should not be limited to the above described embodiment but should be limited solely to the claims that follow.

We claim:

1. A planter for planting seed in a seedbed, the planter comprising:

a frame, the frame having a wheel support member, the wheel support member is provided with left and right sidewalls that are provided with left and right radiused surfaces, respectively;

a furrow opener being mounted to the frame for opening a seed planting furrow in the seedbed;

a seed meter being mounted to the frame for metering seed into a seed tube, the seed tube directing the seed into the seed planting furrow formed by the furrow opener;

a closing wheel assembly for closing the seed planting furrow after seeds have been deposited in the seed planting furrow by the seed tube, the closing wheel assembly being rotatively mounted to a bracket, the closing wheel assembly having a side-to-side position relative to the seed planting furrow, the bracket being adjustably coupled to the frame so that the bracket can be pivoted about a vertical axis to adjust the side-to-side position of the closing wheel assembly relative to the seed planting furrow.

2. A planter as defined by claim 1 wherein the bracket is provided with two radiused bushings that cooperate with the left and right radiused surfaces for adjusting the side-to-side position of the closing wheel assembly relative to the seed planting furrow.

3. A planter as defined by claim 2 wherein two adjustment bolts pass though the two radiused bushings and the left and right sidewalls of the wheel support member for clamping the bracket in place.

4. A planter as defined by claim 3 wherein the left and right sidewalls of the wheel support member being provided with left and right fore/aft extending slots through which the two adjustment bolts pass.

5. A planter as defined by claim 4 wherein each of the two radiused bushings are provided with two semi-circular projections that ride in the left and right fore/aft extending slots.

6. A planter as defined by claim 5 wherein the closing wheel assembly comprises a pair of seed firming wheels for closing and firming soil around the seed planting furrow.

7. An assembly for adjusting the side-to-side position of a closing wheel assembly of a planter having a wheel support member, the assembly comprising:

a bracket which is mounted to the wheel support member, the bracket is provided with left and right radiused bushings;

the closing wheel assembly capable of being rotatably mounted to the bracket; whereby the wheel support member is provided with left and right sidewalls having left and right radiused surfaces respectively, the left and right radiused bushings cooperating with the radiused surfaces so that the bracket can be pivoted about a vertical axis thereby adjusting the side-to-side position of the closing wheel assembly.

8. An assembly as defined by claim 7 wherein the left and right sidewalls of the wheel support member is provided with left and right fore/aft extending slots.

9. An assembly as defined by claim 8 wherein adjustment bolts pass through the radiused bushings and the left and right fore/aft extending slots for clamping the bracket to the wheel support member.

10. An assembly as defined by claim 8 wherein each of the two radiused bushings are provided with two semi-circular projections that ride in the left and right fore/aft extending slots.

11. An assembly as defined by claim 10 wherein the closing wheel assembly comprises a pair of seed firming wheels for closing and firming soil around the seed planting furrow.

* * * * *